United States Patent
Lee et al.

(10) Patent No.: US 8,233,232 B2
(45) Date of Patent: Jul. 31, 2012

(54) METHOD AND DATA STORAGE DEVICE WITH A SNUBBER SUPPORTED ON AN ACTUATOR AND HAVING A DISTAL EDGE CONFIGURED TO HAVE DIFFERING ARCUATE PORTIONS

(75) Inventors: Chuen Buan Lee, Singapore (SG); Choon Kiat Lim, Singapore (SG); Xiong Liu, Singapore (SG); Jui Jing Lim, Singapore (SG)

(73) Assignee: Seagate Technology, Cupertino, CA (US)

( * ) Notice: Subject to any disclaimer, the term of this patent is extended or adjusted under 35 U.S.C. 154(b) by 309 days.

(21) Appl. No.: 12/762,075

(22) Filed: Apr. 16, 2010

(65) Prior Publication Data

US 2011/0255190 A1    Oct. 20, 2011

(51) Int. Cl.
  *G11B 5/012* (2006.01)
(52) U.S. Cl. ...................................... 360/97.2
(58) Field of Classification Search ....... 360/97.19–97.2
  See application file for complete search history.

(56) References Cited

U.S. PATENT DOCUMENTS

| | | |
|---|---|---|
| 6,021,019 A | 2/2000 | Genheimer et al. |
| 6,084,744 A | 7/2000 | Genheimer et al. |
| 6,172,843 B1 | 1/2001 | Genheimer et al. |
| 6,226,145 B1 | 5/2001 | Genheimer et al. |
| 6,535,350 B1 * | 3/2003 | Genheimer et al. ......... 360/97.2 |

* cited by examiner

*Primary Examiner* — Allen Heinz

(57) ABSTRACT

A data storage apparatus and associated method is provided involving a data storage disc that is rotatable around a first axis. An actuator is rotatable around a second axis to operably position a data transfer member between an innermost radial location of the data storage disc and an outermost radial storage location of the data storage disc. A snubber is supported by the actuator and has a distal edge configured as being, in relation to a reference plane including the first axis and the second axis when the actuator is rotated to position the data transfer member at the innermost radial location, arcuate along a first radius on one side of the reference plane and arcuate along a second radius different than the first radius on the other side of the reference plane.

20 Claims, 5 Drawing Sheets

METHOD AND DATA STORAGE DEVICE WITH A SNUBBER SUPPORTED ON AN ACTUATOR AND HAVING A DISTAL EDGE CONFIGURED TO HAVE DIFFERING ARCUATE PORTIONS

SUMMARY

In some embodiments a data storage device is provided having a data storage disc that is rotatable around a first axis. An actuator is rotatable around a second axis to operably position a data transfer member between an innermost radial location of the data storage disc and an outermost radial storage location of the data storage disc. A snubber is supported by the actuator and has a distal edge configured as being, in relation to a reference plane including the first axis and the second axis when the actuator is rotated to position the data transfer member at the innermost radial location, arcuate along a first radius on one side of the reference plane and arcuate along a second radius different than the first radius on the other side of the reference plane.

In some embodiments an actuator for a data storage device is provided having a data storage disc that is rotatable around a first axis. The actuator has an actuator body that is rotatable around a second axis to operably position a data transfer member between an innermost radial location of the data storage disc and an outermost radial storage location of the data storage disc. A snubber is supported by the actuator and has a distal edge configured, in relation to a reference plane including the first axis and the second axis when the actuator is rotated to position the data transfer member at the innermost radial location, on one side of the reference plane as being concave to the second axis and disposed between an outer edge of the data storage disc and the outermost radial storage location, and on the other side of the reference plane as being non-concave to the second axis and disposed between the outer edge of the data storage disc and the outermost radial storage location.

In some embodiments a method is provided including obtaining an actuator for a data storage device having a data storage disc that is rotatable around a first axis. the actuator having an actuator body that is rotatable around a second axis to operably position a data transfer member between an innermost radial location of the data storage disc and an outermost radial storage location of the data storage disc, and a snubber supported by the actuator and having a distal edge configured, in relation to a reference plane including the first axis and the second axis when the actuator is rotated to position the data transfer member at the innermost radial location, on one side of the reference plane as being concave to the second axis and disposed in an annulus between an outer edge of the data storage disc and the outermost radial storage location, and on the other side of the reference plane as being non-concave to the second axis and disposed between the outer edge of the data storage disc and the outermost radial storage location. The method further includes rotating the actuator to move the data transfer member to a first radial storage location where only the distal edge on the one side of the reference plane is within the annulus, and rotating the actuator to move the data transfer member to a second radial storage location where the distal edge on the other side of the reference plane is within the annulus.

DESCRIPTION

Disc drive data storage devices are all the time becoming more commonly used in portable systems having onboard processing systems that are by nature of application subjected to random movement and vibration. A disc drive stores data that must be readily available to a user regardless of the use. Generally, a disc drive has one or more rotating data storage discs in a data transfer relationship with a rotating actuator that moves a data transfer member in a close mating relationship with the discs.

Consumer demands have continually pushed the industry to provide more capacity in a smaller-size package. Those demands necessarily require smaller spacing between the actuator and the data storage discs, and more precise positioning of the actuator relative to the data storage discs. Although meeting these demands, the tight spacing of the data storage discs gives rise to a problem of increased sensitivity of the disc drives to non-operating, mechanical shocks; particularly. predominant failure modes in modern disc drives have been found to include damage to the surfaces of the discs and damage to the actuator arms as a result of mechanical shocks encountered during the shipping, handling, and portable use of the data storage devices.

Computer modeling of particular disc drives has revealed that one primary cause of interference between discs and actuator arms is the first mechanical bending mode of the discs, which has been found to cause a significant portion of the relative motion between the data storage discs and the actuator. The bending mode is generally dependent upon the material, diameter and thickness of the data storage discs, and these factors are not readily modified in a disc drive design.

Figure 1:
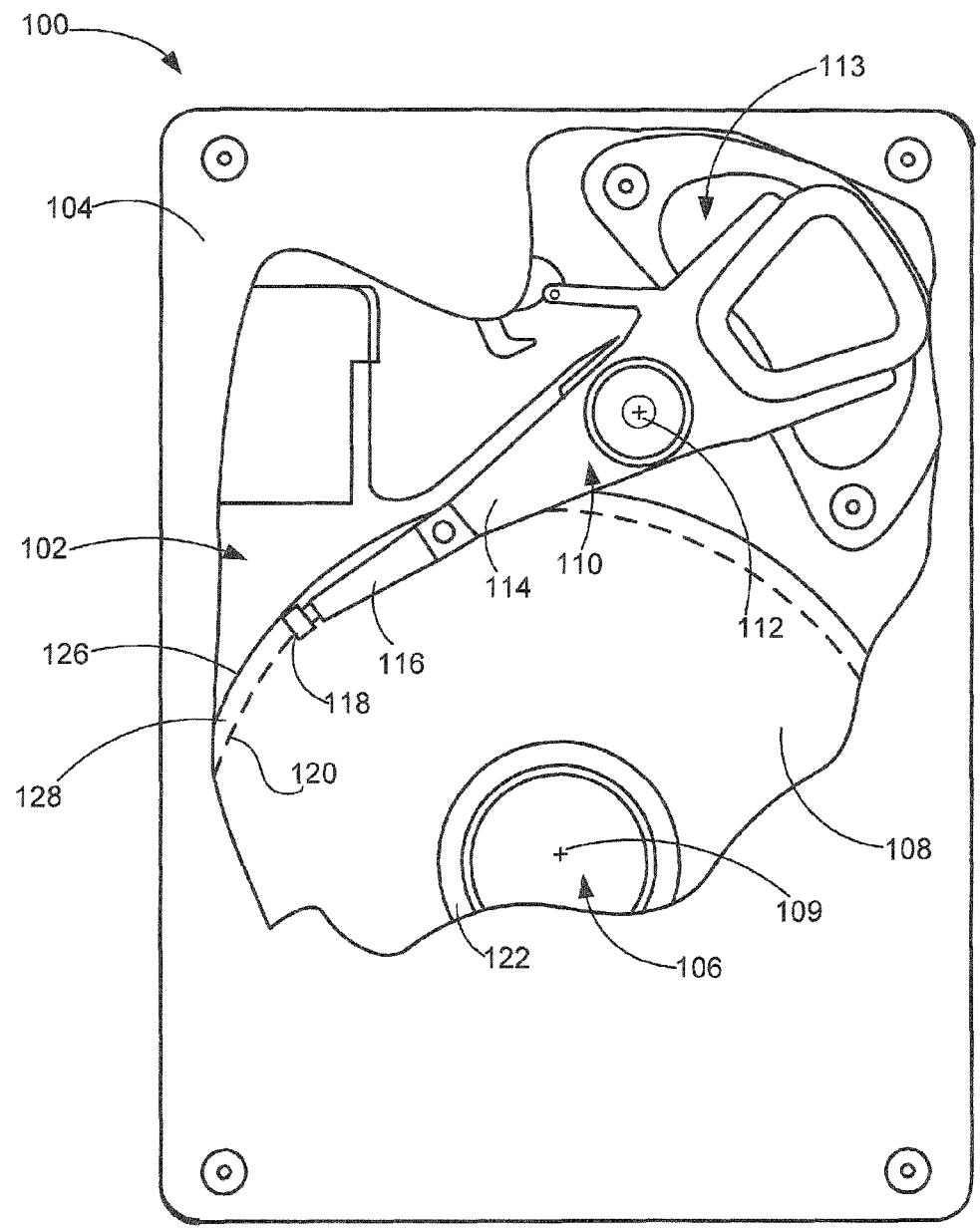
FIG. 1 diagrammatically depicts a top cutaway view of a data storage device that is constructed in accordance with embodiments of the present invention.

Turning now to the drawings collectively and now more particularly to FIG. 1, shown therein is a top view of a data storage device 100 that is constructed in accordance with embodiments of the present invention. The device 100 includes a base 102, to which various disc drive components are mounted, and a cover 104 (shown partially cutaway), which cooperates with the base 102 to provide a sealed internal environment for the device 100.

Mounted to the base 102 is a spindle motor (shown generally at 106) to which one or a plurality of data storage discs 108 are mounted for rotation at a high speed around a first axis 109. Adjacent the discs 108 is an actuator 110 which is pivoted around a second axis 112, such as by a voice coil motor 113. The actuator 110 includes a number of arms 114, one per each disc recording surface, supporting suspensions 116 that, in turn, support data transfer members 118. As such, the data transfer members 118 are selectively positioned with respect to data tracks (only one outermost track 120 depicted diagrammatically) of the discs 108 in order to read data from and write data to the tracks.

The data transfer members 118 are selectively moved between an innermost radial location 122 and the outermost radial storage location 120. In these illustrative embodiments the innermost radial location is an annulus of disc space that is not used for storing data, but is rather a landing space upon which the data transfer member 118 can be parked when the device 100 is shut down or switched to a reduced power mode. In alternative equivalent embodiments the innermost radial location can be an innermost data track, with the landing zone being elsewhere such as a landing ramp beyond the outer edge 126 of the disc 108. Also in these illustrative embodiments between the outermost radial storage location 120 and the outer edge 126 of the disk 108 there is another annulus of non-storage space 128. The non-storage space 128 provides a guard band from the disc edge 126 where fluidic turbulence creates data transfer member 118 positional fluctuations of a magnitude greater than that which facilitates reliable data transfer activity.

Figure 2:
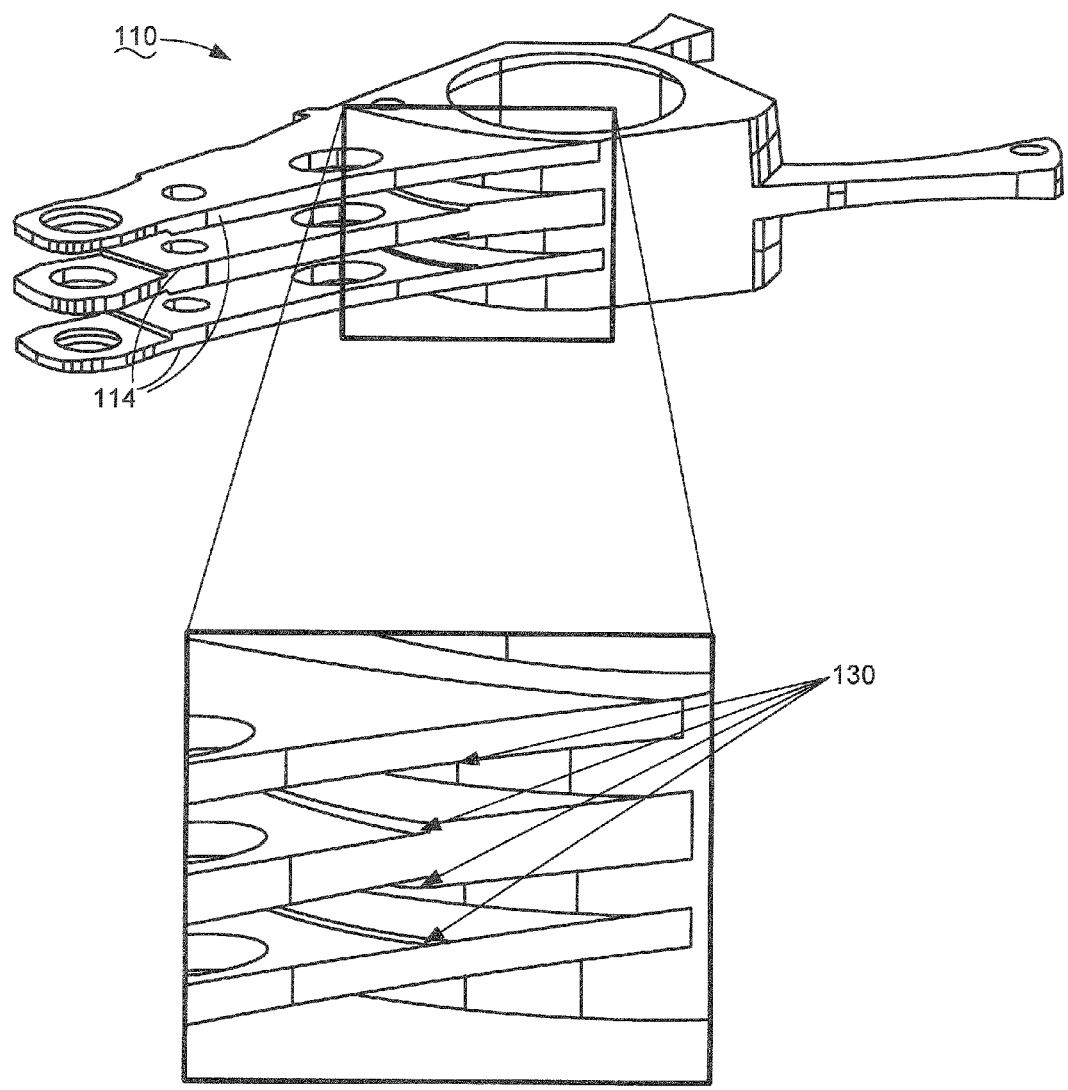
FIG. 2 is an isometric depiction of the actuator of the data storage device of FIG. 1.

FIG. 2 is an isometric depiction of an actuator 110 of the present embodiments suited for use with up to a four-disc stack, wherein two discs 108 can be operably interleaved in spaces between each pair of adjacent arms 114, and two discs 108 can be operably disposed outside the outermost arms 114. As the arms 114 move in close relationship to the respective disc surface, an external shock can cause the disc 108 to deflect and contactingly engage the respective arm 114, likely causing damage to the disc 108 or the arm 114 or both. To prevent that damage, snubbers 130 are provided on each of the arms 114 that are sized to contactingly engage the non-data storage space 128, thereby preventing a contacting engagement between an arm 114 and the storage space of the respective disc surface.

Figure 3:
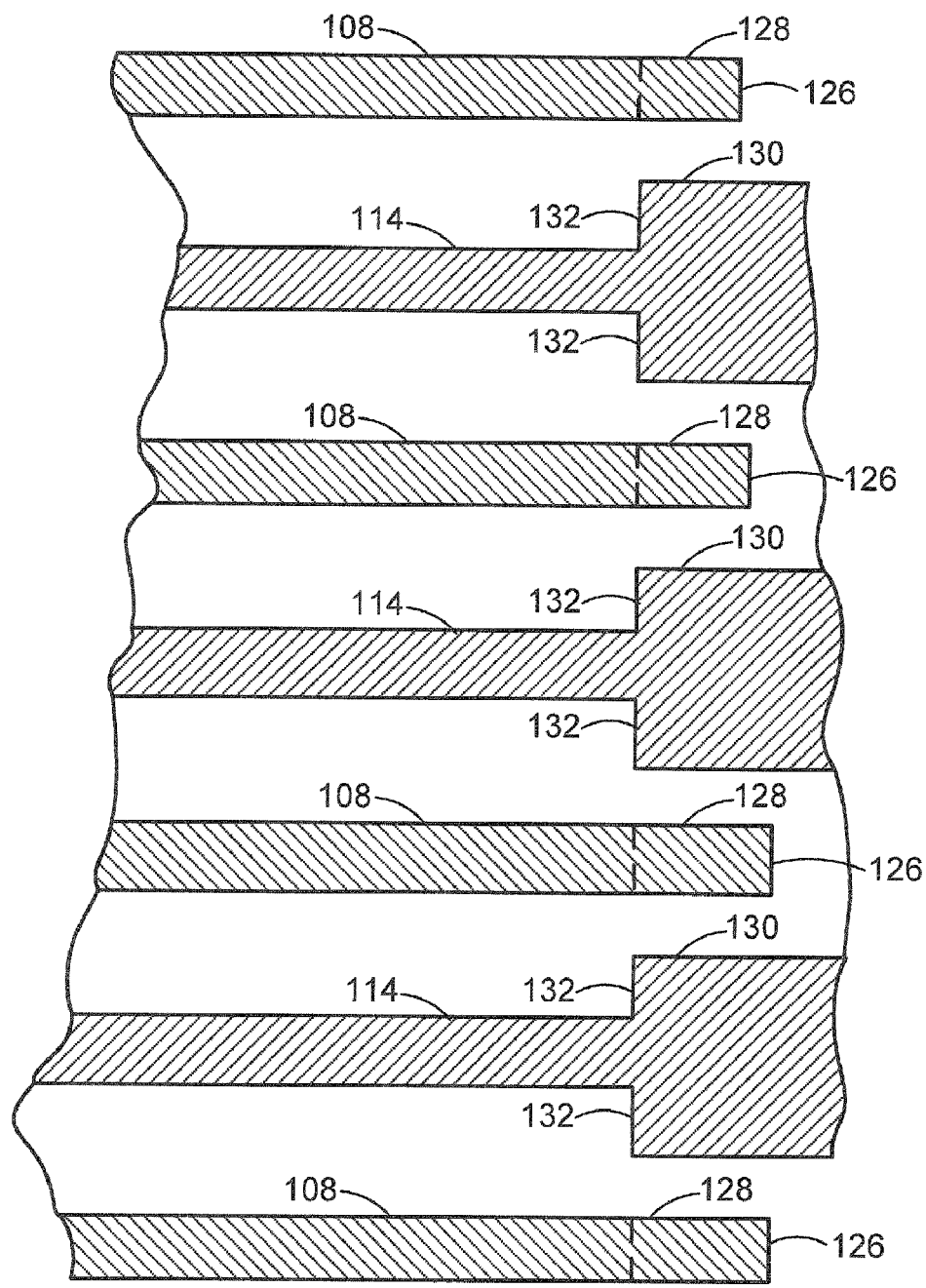
FIG. 3 is a cross sectional view of a portion of the actuator of FIG. 2.

FIG. 3 is an enlarged cross sectional view of the actuator 110 of FIG. 3 and four operably engaged discs 108. Note that each arm 114 defines a surface that is substantially parallel to the respective disc surface and spatially separated therefrom by a clearance that prevents operable contacting engagement in normal circumstances. Each snubber 130 likewise defines a surface that is substantially parallel to the respective disc surface and spatially separated therefrom by a smaller clearance. Note that each snubber 130 has a distal edge 132 encroaching inwardly past the disc edge 126 only within the non-storage space annulus 128. Thus, the smaller clearance between the snubber 130 and respective disc surface means a disc 108 deflection will result in any contact being with only the non-storage area 128 of the disc 108, preventing the damage to disc storage space or stored data on the disc 108. To minimize weight, and hence inertia, the actuator 110 and snubber 130 are unitarily constructed, such as of aluminum.

Figure 4:
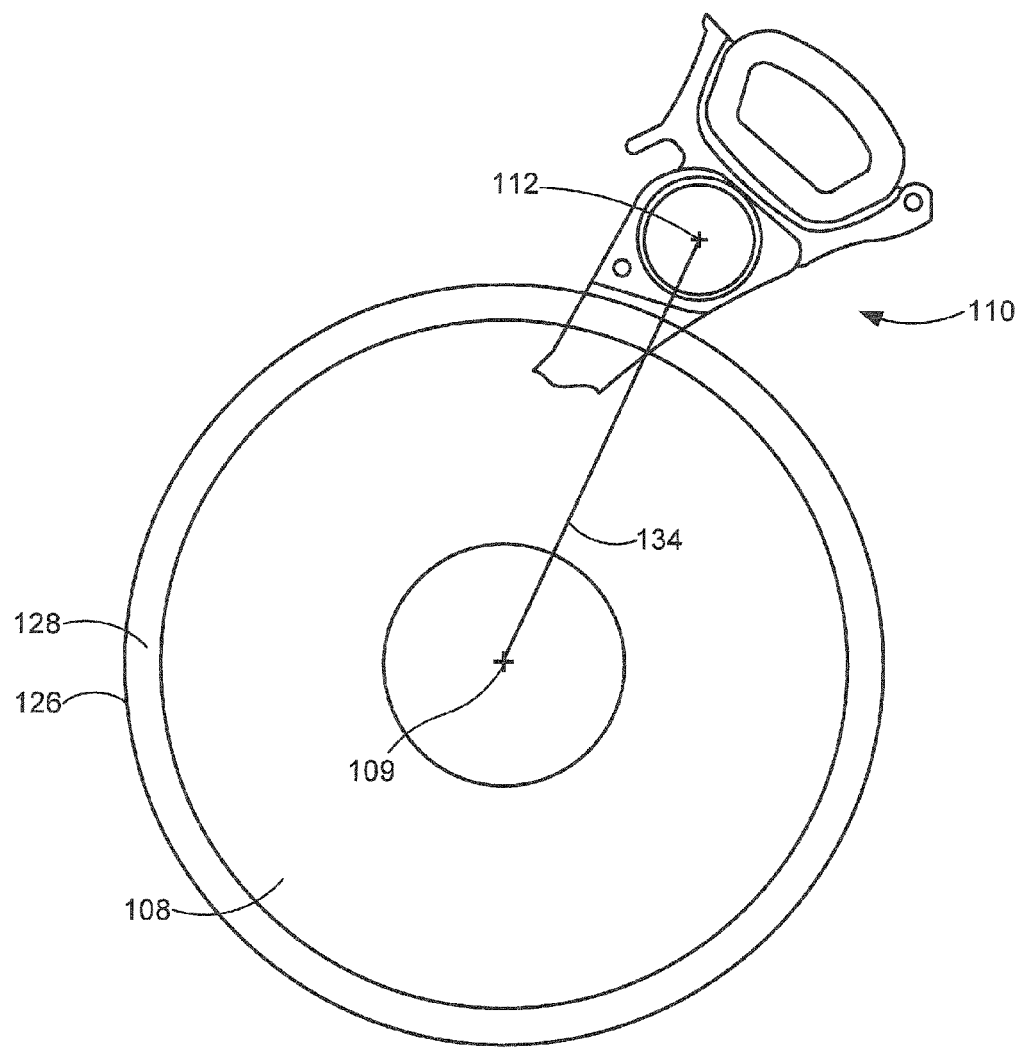
FIG. 4 is a simplified depiction of a portion of the data storage device of FIG. 1.

FIG. 4 is a simplified depiction of the actuator 110 when it is pivoted to position the data transfer member (not shown) at the innermost radial location, be it an innermost radial storage location or a landing zone. The present embodiments optimize the structural integrity of the snubber 130 by sizing it to be as large as possible; that is, to fill the entire portion of the annulus of non-storage space 128 that the actuator 110 encroaches in the position depicted in FIG. 4. That snubber 130 construction ensures an even distribution of force by the snubber 130 in stopping the impacting disc 108, the force thereby acting across as broad a circumferential portion of the disc edge 126 as possible. The evenly distributed snubbing force advantageously minimizes the resonant response of the disc 108 resulting from impact.

Figure 5:
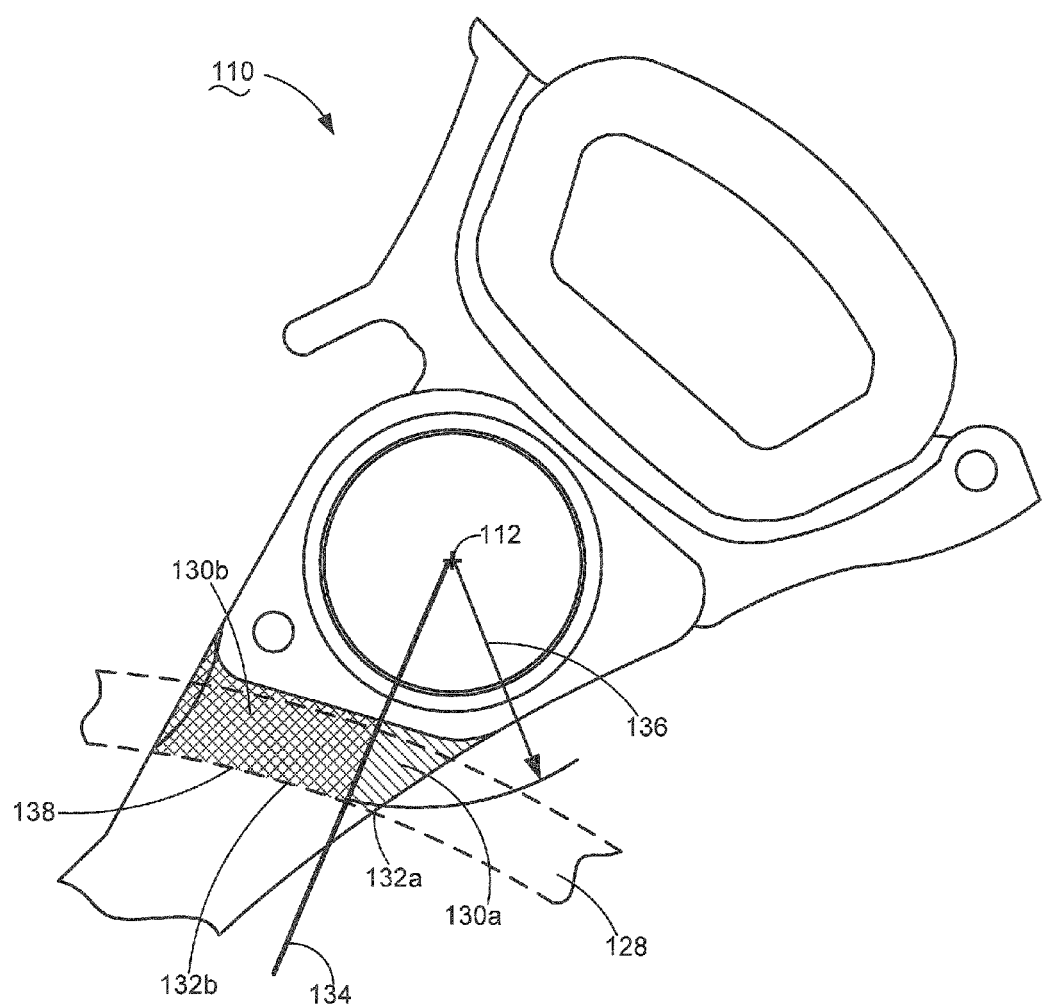
FIG. 5 is an enlarged detail view of a portion of the data storage device of FIG. 4.

At this depicted extent of the depicted counter-clockwise actuator 110 rotation, a reference plane 134 is constructed passing through the first axis 109 and the second axis 112. FIG. 5 is an enlarged detail view showing how the snubber 130 of the present embodiments is constructed in terms of the size of the annulus of non-storage space 128 and disposition of the intersecting reference plane 134.

A radius 136 centered at the second axis 112 is tangent to a radial edge 138 of the annulus of non-storage space 128. A portion of the radius 136 defines a concave edge 132a of the snubber 130 (concave to the second axis 112) on the right-hand side of the reference plane 134 in these illustrative embodiments. The configuration of the portion of the snubber 130a on the right-hand side of the reference plane 134 is thereby depicted by the slanted hatching pattern in FIG. 5.

Letting the radius 136 define the edge of the snubber 130 on the left-hand side of the reference plane 134 would not be in keeping with maximizing the size of the snubber 130, and as such would not be in accordance with the embodiments of the present invention. Rather, in these illustrative embodiments the radial edge 138 defines a non-concave edge (to the second axis 112), or more particularly in these illustrative embodiments a convex edge 132b of the snubber 130 (convex to the second axis 112) on the left-hand side of the reference plane 134. The configuration of the portion of the snubber 130b on the left-hand side of the reference plane 134 is thereby depicted by the cross hatching pattern in FIG. 5. The resulting configuration of the snubber 130 is defined, with respect to the second axis 112, by a concave first radius on one side of the reference plane and a convex second radius different than the first radius on the other side of the reference plane.

It is to be understood that even though numerous characteristics and advantages of various embodiments of the invention have been set forth in the foregoing description. together with details of the structure and function of various embodiments of the invention, this disclosure is illustrative only, and changes may be made in detail, especially in matters of structure and arrangement of parts and values for the described variables, within the principles of the present embodiments to the full extent indicated by the broad general meaning of the terms in which the appended claims are expressed.

What is claimed:

1. A data storage device comprising:
    a data storage disc that is rotatable around a first axis;
    an actuator that is rotatable around a second axis to operably position a data transfer member between an innermost radial location of the data storage disc and an outermost radial storage location of the data storage disc;
    a snubber supported by the actuator and having a distal edge configured as being, in relation to a reference plane including the first axis and the second axis when the actuator is rotated to position the data transfer member at the innermost radial location, arcuate along a first radius on one side of the reference plane and arcuate along a second radius different than the first radius on the other side of the reference plane.

2. The data storage device of claim 1 wherein the snubber distal edge is concave to the second axis on one side of the reference plane and non-concave to the second axis on the other side of the reference plane.

3. The data storage device of claim 2 wherein the snubber distal edge is convex to the second axis on the other side of the reference plane.

4. The data storage device of claim 1 wherein the first radius is centered at the second axis.

5. The data storage device of claim 4 wherein the first radius is defined by being tangential to a radial edge of an annulus of non-storage space of the data storage disc between an outer edge of the data storage disc and the outermost radial storage location.

6. The data storage device of claim 1 wherein the second radius centered at the first axis.

7. The data storage device of claim 6 wherein the second radius is defined by a radial edge of an annulus of non-storage space of the data storage disc between an outer edge of the data storage disc and the outermost radial storage location.

8. The data storage device of claim 1 wherein the data transfer member is supported by an arm having a surface substantially parallel to the data storage disc and operably spatially disposed therefrom by a first clearance, and the snubber having a surface substantially parallel to the data storage disc and operably spatially disposed therefrom by a second clearance that is less than the first clearance.

9. The data storage device of claim 1 wherein the innermost radial location is a non-storage space of the data storage disc.

10. The data storage device of claim 1 wherein the innermost radial location is an innermost radial storage location.

11. An actuator for a data storage device having a data storage disc that is rotatable around a first axis, the actuator comprising:
- a body that is rotatable around a second axis to operably position a data transfer member between an innermost radial location of the data storage disc and an outermost radial storage location of the data storage disc; and
- a snubber supported by the actuator and having a distal edge configured, in relation to a reference plane including the first axis and the second axis when the actuator is rotated to position the data transfer member at the innermost radial location, on one side of the reference plane as being concave to the second axis and disposed between an outer edge of the data storage disc and the outermost radial storage location, and on the other side of the reference plane as being non-concave to the second axis and disposed between the outer edge of the data storage disc and the outermost radial storage location.

12. The actuator of claim 11 wherein the distal edge on the one side of the reference plane defines a first radius and the distal edge on the other side of the reference plane defines a second radius different than the first radius.

13. The actuator of claim 12 wherein the first radius is centered at the second axis.

14. The actuator of claim 12 wherein the second radius is centered at the first axis.

15. The actuator of claim 12 wherein the first radius is defined by being tangential to a radial edge of an annulus of non-storage space of the data storage disc between the outer edge of the data storage disc and the outermost radial storage location.

16. The actuator of claim 12 wherein the second radius is defined by a radial edge of an annulus of non-storage space of the data storage disc between an outer edge of the data storage disc and the outermost radial storage location.

17. The actuator of claim 11 wherein the actuator and the snubber are unitarily constructed.

18. The actuator of claim 11 wherein the innermost radial location is a non-data storage space of the data storage disc.

19. The actuator of claim 11 wherein the innermost radial location is an innermost data storage location of the data storage disc.

20. A method comprising:
- obtaining an actuator for a data storage device having a data storage disc that is rotatable around a first axis, the actuator being operably rotatable around a second axis to position a data transfer member between an innermost radial location of the data storage disc and an outermost radial storage location of the data storage disc, and a snubber supported by the actuator and having a distal edge configured, in relation to a reference plane including the first axis and the second axis when the actuator is rotated to position the data transfer member at the innermost radial location, on one side of the reference plane as being concave to the second axis and on the other side of the reference plane as being non-concave to the second axis;
- rotating the actuator to move the data transfer member to a first radial storage location where only the distal edge on the one side of the reference plane is within an annulus of non-storage space of the data storage disc between the outer edge of the data storage disc and the outermost radial storage location; and
- rotating the actuator to move the data transfer member to a second radial storage location where the distal edge on the other side of the reference plane is within the annulus.

* * * * *